Sept. 30, 1952      H. T. SPARROW      2,612,225
ENGINE PRESSURE AND SPEED CONTROL DEVICE
Filed March 28, 1946      3 Sheets-Sheet 2
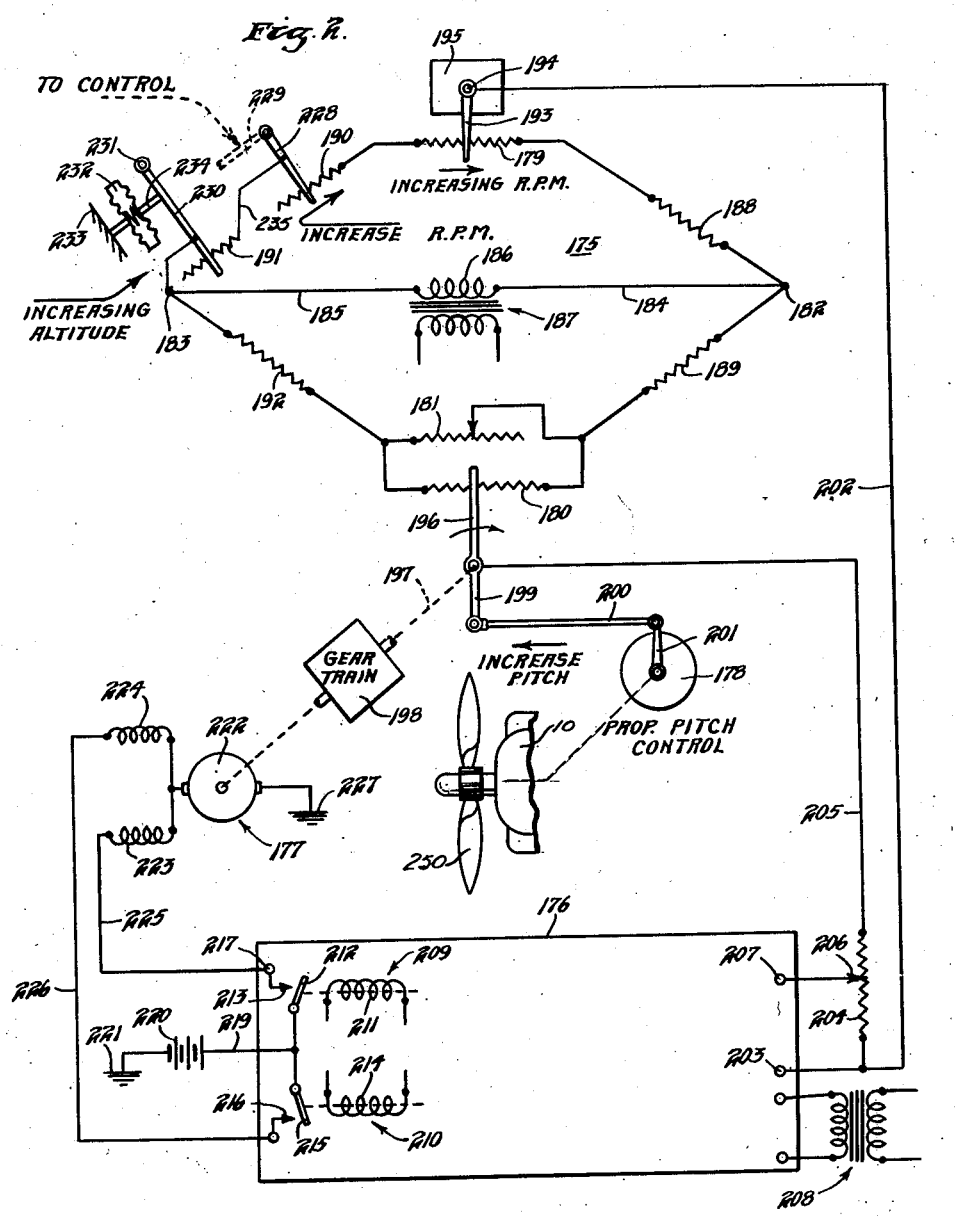
Inventor
HUBERT T. SPARROW
By George H. Fisher
Attorney

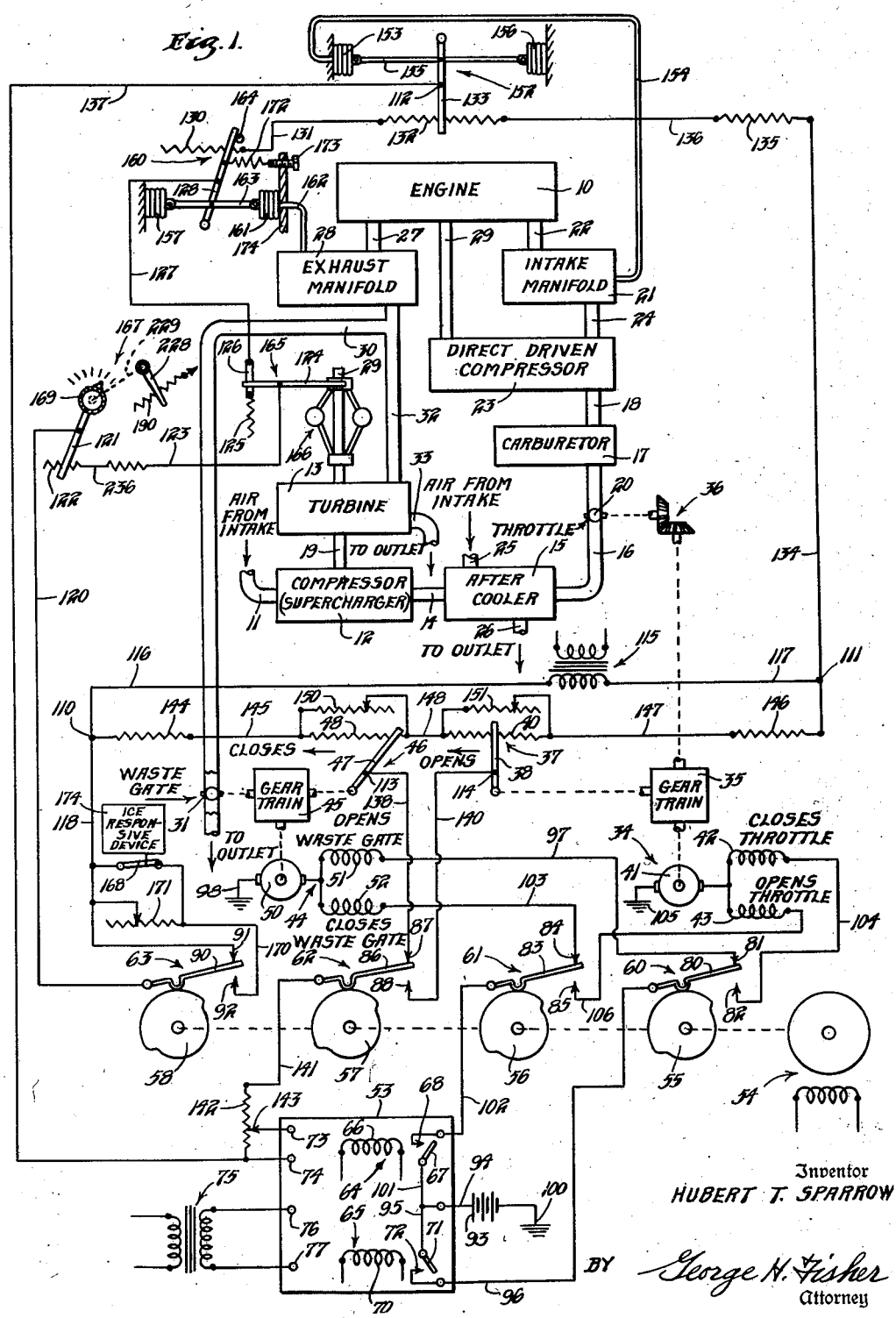

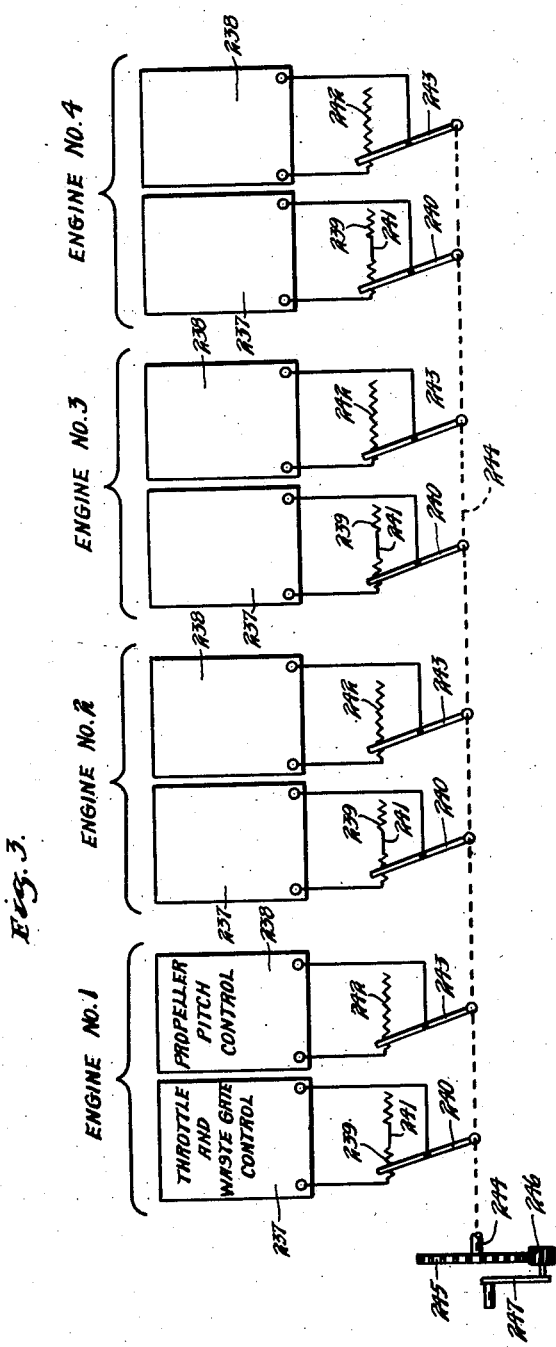

Patented Sept. 30, 1952

2,612,225

UNITED STATES PATENT OFFICE 2,612,225

ENGINE PRESSURE AND SPEED CONTROL DEVICE

Hubert T. Sparrow, Minneapolis, Minn., assignor to Minneapolis-Honeywell Regulator Company, Minneapolis, Minn., a corporation of Delaware Application March 28, 1946, Serial No. 657,887

19 Claims. (Cl. 170—135.74)

This invention relates generally to control apparatus for internal combustion engines, and more specifically to controls for aircraft power plants, including the engines and propellers driven thereby.

In the ordinary internal combustion engine the output, in horsepower, is a function of two main variables. These are the weight of fuel fed to the cylinders for combustion therein, and the speed at which the engine operates. Most of the remaining factors determining the horsepower output are generally fixed by the design of the engine, these being the length of piston stroke, area of the piston head and the number of cylinders in the engine. The weight of fuel determines the combustion pressure on the pistons, while the speed, expressed in R. P. M., determines the number of power strokes per unit of time.

The weight of the fuel which can be properly ignited and burned is a function mainly of the intake manifold pressure, or the amount of air supplied to the carburetor for admixture with the fuel, and in an aircraft engine the provision of adequate manifold pressure is complicated by the changes in atmospheric pressure continuously encountered by the aircraft as it flies at different levers. It is customary to provide mechanical means for increasing the manifold pressure above the atmospheric pressure and to so control this mechanical pressure raising operation, commonly called supercharging, as to compensate for the decreasing weight and pressure of the air as the aircraft ascends, and in order to maintain an adequate oxygen supply for proper combustion of the fuel. The rate at which the supercharging is carried out is also correlated with engine speed, in order to provide optimum power output for the engine as will appear in the course of this specification.

Engine speed, in the case of the aircraft engine installation, is a function mainly of the propeller pitch and the resulting resistance to its movement by the engine, the higher pitch setting of the propeller tending to reduce engine speed due to the greater power required, and vice versa. The propeller pitch is usually variable and is controlled by a governor mechanism which is set to provide a pitch angle such as to maintain a certain value of engine speed under certain conditions, the governor then compensating automatically for variations in engine speed, such as caused by ascending or descending travel of the aircraft, by readjusting propeller pitch as may be required.

It is frequently, if not usually, desirable to operate an aircraft engine at its optimum power output under varying flight conditions and the proper control of the factors hereinbefore mentioned as affecting the power output is accordingly required. The individual control and adjustment of these factors, particularly as they have usually been controlled by hand, is difficult and requires far too much of the pilot's or engineer's, otherwise well occupied time, and it is therefore extremely desirable that so much as possible of all necessary interrelated adjustments be accomplished automatically and under influence of a single hand operated control, even in a multi-engined aircraft.

Having in mind these facts, it is the primary object of my invention to provide a control system and apparatus by means of which the manifold pressure of an engine, and the engine speed, may be conveniently adjusted by a single hand control and in which the control will automatically select proper manifold pressures and speeds to maintain optimum operating conditions when required and compensate for the many variables entering into such optimum proportioning of these factors.

Another object is to provide a control apparatus well adapted to control of a single engine and propeller installation, or a plurality thereof and which, in the latter case, embodies means for individually synchronizing the various adjustments of each engine and propeller.

A further object is to provide control apparatus which in the greater part is of an electrical and electronic nature, so that very little mechanical linkage is necessary.

A further object of the invention is to provide control apparatus of the above type in which an impedance network responsive to a condition affecting manifold pressure is employed to maintain said condition at a selected value and in which a manually operable device is employed to adjust an impedance in said network to vary the pressure maintained and to simultaneously vary the setting of a device for controlling the engine speed.

A still further object of the invention is to provide such an arrangement in which the speed of the propeller is increased as the manifold pressure is increased by adjustment of the manually operable device.

A still further object of the present invention is to provide an arrangement such as set out in the immediately preceding objects in which the impedance network is effective to first move the throttle towards open position and then upon a further demand for pressure to move a control device of a supercharger to a position increasing the supercharging effect.

The altitude at which the airplane flies has, as stated, an influence on all of the variables affecting engine output and this is particularly true at the very high altitudes which are commonly attained. My invention therefore has a further and important object, the provision of means for compensating for the effects of altitude entirely automatically and in such a manner as to keep the engine, and particularly the propeller, operating at maximum efficiency under ordinary conditions.

A further object of my invention is to provide an aircraft engine control system in which the propeller speed increases with an increase in altitude.

Other objects and advantages of my invention will be made apparent in the course of the following specification, reference being had therein to the accompanying drawing in which:

Figure 1 is a diagrammatical illustration of the throttle and manifold pressure controlling apparatus forming a part of my invention;

Figure 2 is a similar showing of the cooperating apparatus for controlling engine speed; and Figure 3 is a diagram showing the application of the complete control apparatus to four engines of an aircraft.

This application is a continuation in part of my co-pending application for patent on Control Apparatus, Ser. No. 474,378, filed February 1, 1943, now U. S. Patent No. 2,540,916, issued on February 6, 1951.

In the present drawing, Figure 1 illustrates an apparatus similar to that disclosed in Figure 1, and claimed, in my above identified application, this apparatus serving to control the throttle and the manifold pressure of an engine and including a manual selector control, which is modified slightly in accordance with this invention, and which is arranged for operation in conjunction with another selector which controls the engine speed, as will be described herein.

FIGURE 1

Referring now more particularly to Figure 1, I have shown therein an internal combustion engine 10, represented diagrammatically, and which may be the motive power for an aircraft. Air for supporting the combustion of fuel in the engine is supplied from an intake (not shown) which may be a scoop located in a leading edge of the aircraft wing, and passes through a duct 11, a compressor or supercharger 12 driven by a turbine 13, a duct 14, an after-cooler 15 and a duct 16, wherein is located a throttle valve 20, to a carburetor 17 where it is mixed with the fuel in the usual manner. From the carburetor 17 the fuel and air mixture passes through a duct 18 and enters a compressor 23 which is directly driven from the engine by a shaft 29, the mixture finally entering the intake manifold 21 for admission to the engine cylinders. Ducts 24 and 22 are shown as means for delivering the mixture from the compressor to the manifold and from the manifold to the engine.

The compressor 12 is essentially a high speed fan, so that when the compressor is stationary, the air may pass freely through it, with only a relatively small amount of resistance due to friction. The after-cooler 15 is a heat exchanger for removing the heat of compression from the air discharged by the compressor 12. Cooling air from an intake not shown in the drawing, and preferably located in the leading edge of a wing of the aircraft, enters the after-cooler through a duct 25, and after passing through a series of tubes or other heat exchanging structure so that it absorbs some of the heat from the air discharged by the compressor 12, passes through a duct 26 to an outlet which may be located in the trailing edge of a wing of the aircraft.

The direct driven compressor 23 is also of the fan type, and since it is driven by the engine 10, its speed and hence its compressing effect varies directly as the speed of the engine 10. On some types of aircraft engines, the direct driven compressor is an integral part of the engine, and serves not only as a compressor but as a means for evenly distributing the fuel and air mixture to the various cylinders.

Although I have shown the compressor 23 and the intake manifold 21 as separate units, on most engines the direct-driven compressor is inside the housing generally referred to as the intake manifold. They are shown separately in the present diagrammatic disclosure merely for the purpose of simplifying the discussion.

Exhaust gases from the engine 10 pass through a duct 27 to an exhaust manifold 28. From the exhaust manifold 28, the exhaust gases may pass either through a duct 30 controlled by a waste gate 31 to an outlet not shown in the drawing, or through a duct 32 to the turbine 13, and from the turbine 13 through a duct 33 to the discharge outlet. It may be seen that when the waste gate 31 is open, the resistance to passage of exhaust gases through the duct 30 is much lower than the resistance to the passage of gases through the duct 32 and turbine 13. Therefore, when the waste gate 31 is open, the turbine 13 is not operated or operates at very slow speed. As the waste gate is closed, the pressure in the exhaust manifold increases, until the pressure differential between the exhaust manifold and the outside atmosphere is sufficient to cause rotation of the turbine 13.

The throttle 20 is driven by a motor, generally indicated at 34, through a gear train 35, and a pair of bevel gears indicated at 36. The motor 34 also drives a throttle follow-up potentiometer 37, which comprises a slider 38 movable along a slidewire resistance 40. The motor 34 is shown, by way of example, as being of the direct current series wound type, and includes an armature 41 and a pair of field windings 42 and 43. As indicated by the legends in the drawing, energization of a series circuit including armature 41 and field winding 42 causes rotation of the armature 41 in a direction to close the throttle and to move the slider 38 of follow-up potentiometer 37 to the right along resistance 40. On the other hand, energization of armature 41 and field winding 43 causes rotation of motor 34 in a direction to open the throttle 20 and to move the slider 38 to the left along resistance 40.

The waste gate 31 is driven by a motor, generally indicated at 44, through a gear train 45. The motor 44 also drives a waste gate follow-up potentiometer 46, which comprises a slider 47 movable along a slidewire resistance element 48. The motor 44 is also of the direct current series wound type, and is provided with an armature 50 and a pair of field windings 51 and 52. As indicated by the legends in the drawing, when the armature 50 and field winding 51 are both energized, the armature 50 rotates in a direction to drive the waste gate towards its open position and to move the slider 47 to the right along resistance element 48. On the other hand, when the armature 50 and field winding 52 are energized, the armature 50 rotates in a direction to close the waste gate 31 and to move the slider 47 to the left along resistance 48.

The energization of motors 34 and 44 is controlled by an electronic amplifier 53 and a cycling switch arrangement which includes a continuously running motor 54, cams 55, 56, 57 and 58 driven thereby, and switches 60, 61, 62 and 63 operated by the respective cams.

The amplifier 53 may be of any conventional type in which one or the other of two output circuits is energized depending upon the phase of the input signal. For example, I may use an amplifier of the type described in Figure 2 of the co-pending application of Albert P. Upton, Serial No. 437,561, dated April 3, 1942. The amplifier 53 includes a pair of relays 64 and 65. The relay 64 comprises a winding 66 which controls the movement of a switch arm 67 cooperating with a stationary contact 68, with which it is engaged when the winding 66 is energized. Similarly, the relay 65 includes a winding 70 which controls the movement of a switch arm 71 cooperating with a stationary contact 72, with which it is engaged when the winding 70 is energized. As explained in the Upton application previously referred to, the windings 66 and 70 are selectively energized by the amplifier 53, in accordance with the phase of an alternating electrical signal potential applied to input terminals 73 and 74 of amplifier 53. The amplifier 53 is supplied with electrical energy from an alternating current source through a transformer 75, whose secondary winding is connected to power input terminals 76 and 77 of amplifier 53.

The switch 60 comprises a switch arm 80 movable between an upper stationary contact 81 and a lower stationary contact 82. The switch 61 comprises a switch arm 83 movable between an upper stationary contact 84 and a lower stationary contact 85. The switch 62 includes a switch arm 86 movable between an upper stationary contact 87 and a lower stationary contact 88. The switch 63 includes a switch arm 90 movable between an upper stationary contact 91 and a lower stationary contact 92.

It should be readily apparent from an inspection of the drawing, that as the motor 54 rotates the cams 55, 56, 57 and 58, the switches 60, 61, 62 and 63 are so operated that each switch arm engages its associated upper stationary contact during one-half revolution of the cam, and engages its lower stationary contact during the other half revolution of the cam.

Only the switches 60 and 61 are concerned in the energizing circuits for the motors 34 and 44. When the cams 55 and 56 are in a position such as that shown in the drawing, wherein the switch arms 80 and 83 engage their respective upper stationary contacts 81 and 84, the waste gate motor 44 is under the control of the relays 64 and 65 in the amplifier 53. At such a time, an energizing circuit for field winding 51 and armature 50 of motor 44 may be traced from the left-hand terminal of a battery 93, conductors 94 and 95, switch arm 71, contact 72, a conductor 96, a switch arm 80, contact 81, a conductor 97, field winding 51, armature 50, and ground connections 98 and 100 to the opposite terminal of battery 93. Similarly, an energizing circuit for field winding 52 and armature 50 may be traced from the left-hand terminal of battery 93, through conductors 94 and 101, switch arm 67, contact 68, conductor 102, switch arm 83, contact 84, a conductor 103, field winding 52, armature 50, and ground connections 98 and 100 to the right-hand terminal of battery 93. It may therefore be seen that at such a time, the armature 50 of motor 44 is rotated in a direction dependent upon the phase of an alternating signal potential impressed on the input terminals 73 and 74 of amplifier 53.

During the half revolution of cams 55 and 56 when the switch arms 80 and 83 engage their respective lower stationary contacts 82 and 85, the waste gate motor 44 is no longer under control of amplifier 53, which instead controls throttle motor 34. At such a time, an energizing circuit for field winding 42 and armature 41 of motor 34 may be traced from the left-hand terminal of battery 93 through conductors 94 and 95, switch arm 71, contact 72, conductor 96, switch arm 80, contact 82, a conductor 104, field winding 42, armature 41, and ground connections 105 and 100 to the right-hand terminal of battery 93. Similarly, an energizing circuit for field winding 43 and armature 41 may be traced from the left-hand terminal of battery 93 through conductors 94 and 101, switch arm 67, contact 68, conductor 102, switch arm 83, contact 85, a conductor 106, field winding 43, armature 41, and ground connections 105 and 100 to the right-hand terminal of battery 93. Since the relays 64 and 65 of amplifier 53 are selectively energized in accordance with the phase of an alternating signal applied to input terminals 73 and 74, it may be seen that the motor 34 is rotated in a direction dependent upon the phase of the signal applied to those input terminals.

The input terminals 73 and 74 of amplifier 53 are supplied with an alternating signal potential of a given phase or of the opposite phase, depending upon the direction of unbalance of an electrical network of the Wheatstone bridge type, having a pair of input terminals 110 and 111, and three output terminals 112, 113 and 114. This bridge circuit is supplied with electrical energy from a transformer 115 whose secondary winding is connected to the input terminals 110 and 111 through conductors 116 and 117, respectively.

The upper left arm of the bridge circuit, as it appears in the drawing, connects input terminal 110 with output terminal 112, and may be traced from input terminal 110 through a conductor 118, contact 91, switch arm 90, a conductor 120, a slider 121 and a portion of a cooperating resistance element 122, a conductor 123, a slider 124, a resistance element 125 and a contact 126 which cooperate with slider 124, a conductor 127, a slider 128, a resistance element 130 which cooperates with slider 128, a conductor 131, a slidewire resistance element 132 and a slider 133 which cooperates therewith to output terminal 112, which is located on slider 133.

The upper right arm of the bridge circuit, as it appears in the drawing, connects the input terminal 111 with output terminal 112. This arm may be traced from input terminal 111, through a conductor 134, a fixed resistance 135, a conductor 136, a portion of resistance 132 and slider 133 to output terminal 112.

The bridge output terminal 112 is connected through a conductor 137 to the input terminal 74 of amplifier 53. Bridge output terminal 113 is connected through a conductor 138 to upper stationary contact 87 of switch 62. Output terminal 114 is connected through a conductor 140 to lower stationary contact 88 of switch 62. When switch arm 86 engages the upper terminal 87, then terminal 113 serves as the output terminal of the bridge circuit, and when switch arm 86 engages contact 88, then terminal 114 serves as the output terminal of the bridge circuit. Either output terminal 113 or 114, depending upon the position of switch arm 86, is connected through switch arm 86 and a conductor 141 to one terminal of a resistance element 142 whose opposite terminal is connected to the conductor 137. A tap 143 movable along resistance 142 is connected directly to input terminal 73 of amplifier 53.

Since, when the parts are in the positions shown in the drawing, the terminal 113 is acting as the second output terminal of the bridge circuit, the lower left arm of the bridge circuit may be considered as including those elements which interconnect input terminal 110 with output terminal 113. This lower left arm may therefore be traced from input terminal 110 through a fixed resistance 144, a conductor 145, resistance 48 and the slider 46 to output terminal 113. Similarly, the lower right arm of the bridge circuit may be traced from input terminal 111 through a fixed resistance 146, a conductor 147, resistance element 40, a conductor 148, a slider 47 to output terminal 113.

A variable resistance 150 is connected in parallel with the resistance 48. Adjustment of resistance 150 determines the total potential drop across resistance 48, and hence determines the potential drop per unit length of resistance 48. Similarly, a variable resistance 151 is connected in parallel with the resistance 40 of the throttle follow-up potentiometer 37.

The slider 133 and resistance element 132 together form a control potentiometer 152. The slider 133 is moved along the resistance 132 in accordance with the absolute pressure existing in the intake manifold 21. A flexible bellows 153 has its interior connected through a tube 154 with the intake manifold 21, so that the pressure existing inside the manifold 21 is transmitted to the inside of the bellows 153. One end of the bellows 153 is fixed, and its other end is connected through a link 155 to the slider 133. Another bellows 156 is evacuated. The bellows 156 is also fixed at one end, and its free end is connected to the end of link 155 opposite the bellows 153. Atmospheric pressure exists adjacent the outside surfaces of both bellows 153 and 156. When a change in atmospheric pressure occurs, the forces produced by the two bellows on the link 155 oppose each other, so that no motion of slider 133 results. However, if the pressure in the intake manifold 21 changes, the bellows 153 expands or contracts without opposition from bellows 156 other than that caused by its normal spring rate, and the slider 133 is moved over the resistance 132. Therefore it may be seen that the position of slider 133 with respect to resistance 132 is a measure of the absolute pressure existing within the intake manifold 21.

The slider 128 and the resistance element 130 together form a compensating controller 160. The slider 128 is movable along resistance 130 by means of a bellows 161, whose interior is connected by a tube 162 to the exhaust manifold 28. The bellows 161 is fixed at one end, and its opposite end is connected by a link 163 to the slider 128. An evacuated bellows 157 acts on the opposite end of link 163 to compensate the action of bellows 161 for variations in atmospheric pressure, in the same manner that evacuated bellows 156 compensates the action of bellows 153, as described above. Since the interior of bellows 161 is supplied with pressure from the exhaust manifold 28, and its action is compensated for variations in atmospheric pressure, by means of bellows 157, it may be stated that the position of slider 128 is a measure of the absolute pressure existing in the exhaust manifold 28. This pressure differential is in turn a measure of the power being delivered to the turbine. The slider 128 is biased into engagement with a stop 164 by a spring 172. The tension of spring 172 may be adjusted by rotation of a screw 173 which threadedly engages a stationary member 174. Adjustment of screw 173 determines the particular value of pressure in the exhaust manifold 28 at which the controller 160 begins to insert resistance in the bridge circuit. During the normal range of pressure in the exhaust manifold 28, the slider 128 rests against stop 164 at the right end of its range of movement. At such a time, none of the resistance 130 is connected in the upper left arm of the bridge circuit. When the exhaust back pressure increases to a value which represents the top safe back pressure for reliable engine operation, the bellows 161 starts to move the slider 128 across resistance 130, thereby inserting part of the resistance 130 in the bridge circuit.

The slider 124 and the cooperating resistance element 125 and contact 126 together form a second compensating controller 165. The slider 124 is moved along contact strip 126 and resistance 125 by a governor device schematically indicated at 166, in accordance with the speed of shaft 19 of turbine 13. The governor 166 and the controller 165 are so related that in the normal speed range of the turbine, the slider 124 engages the contact strip 126, and hence introduces no resistance into the bridge circuit. As the shaft 19 approaches its limiting speed, the governor 166 moves the slider 124 along the resistance 125 to insert an increasing amount of resistance into the bridge circuit.

The slider 121 is movable along resistance 122 by a manually operable knob 169. The knob 169, slider 121 and resistance 122 together form a control point adjuster 167. This device is located in a position where it may be controlled by the pilot or some other member of the screw of the aircraft. Movement of slider 121 by means of knob 169 determines the value of the pressure within the intake manifold 21 which the system will maintain. The knob 169 is mechanically connected to a slider 228 associated with a further resistor which will be referred to later.

When cam 58 is in such a position that switch arm 90 of switch 63 engages the lower stationary contact 92, the upper left arm of the bridge circuit may be traced from input terminal 110 through a portion of conductor 118, a normally closed switch 168, a conductor 170, and lower stationary contact 92 to switch arm 90, and hence as before to output terminal 112 of the bridge circuit. When the switch 168 is open, this portion of the bridge circuit also includes a variable resistance 171, which is normally shunted by the switch 168. The switch 168 may be manually operated, or it may be automatically operated by a device 174 responsive to the presence of icing conditions; one such device suitable for the purpose is the one disclosed in the co-pending application of Waldo H. Kliever, Serial No. 463,259, filed October 24, 1942. The switch 168 of the present application may be, for example, the switch 133 of Figure 14 of the Kliever application. If any other ice detecting mechanism is employed, the switch 168 will be actuated by an element thereof movable in accordance with the presence or absence of ice or ice producing conditions.

*Operation of Figure 1*

From the foregoing description it should be understood that the bridge circuit, through the amplifier 53, alternately controls first the waste gate motor 44 and then the throttle motor 34. This alternate control of the two motors is effected by operation of the switches 60 and 61 by the continuously running motor 54. Furthermore, because of the operation of the switch 62, when the amplifier 53 controls the waste gate motor 44, the potential difference between output terminals 112 and 113 is impressed on the amplifier input terminal. On the other hand, when the amplifier controls the throttle motor 34, the potential difference between the output terminals 112 and 114 is impressed on the amplifier input terminal.

Consider first the condition existing when the amplifier 53 is controlling the throttle motor 34. Assume that the pressure in the intake manifold is such that the bridge circuit is balanced when the throttle is half way open, and the throttle follow-up potentiometer 37 is therefore in its center position, as shown in the drawing. The bridge circuit is said to be balanced when no potential difference exists between the output terminals, in this case, terminals 112 and 114. When no potential difference exists between these terminals, no potential is impressed on the input terminals 73 and 74 on the amplifier 53. Hence neither of the relays 64 and 65 is energized, and the throttle motor therefore remains stationary.

With the same conditions existing in the system, consider the operation which takes place when the amplifier 53 is controlling the waste gate motor 44. At such a time, the potential difference between output terminal 112 and output terminal 113 is impressed on the input terminal of amplifier 53. Since slider 38 is at the same potential as output terminal 112, the potential then impressed on the amplifier input terminal is equal to the potential drop along the resistance 40 between the slider 38 and the left terminal of resistance 40.

For the sake of convenience in describing the operation of this system, consider that the operation is taking place during a half cycle when a left end of the secondary winding of the transformer 115 is positive, and its right terminal is negative. During the alternate half cycles, the polarity of any specific potential is opposite to that described.

It will therefore be seen that, with the various parts in the positions shown in the drawing, the difference of potential between output terminals 112 and 113 of the bridge circuit is of a polarity such that terminal 113 is positive with respect to terminal 112. As this potential is applied to the input terminals of amplifier 53, its polarity is such that input terminal 73 is positive with respect to input terminal 74. The amplifier 53 is so connected that it responds to a potential of this polarity, or phase, by energizing winding 70 of relay 65. Energization of winding 70 causes switch arm 71 to engage contact 72, thereby completing the energizing circuit, previously traced, for field winding 51 and armature 50 of waste gate motor 44. Energization of this field winding and the armature causes the motor 44 to run in a direction to open the waste gate. However, the waste gate is already fully open, and the waste gate follow-up potentiometer 46 has reached the limit of its movement in the gate opening direction. Therefore the motor 44 is merely stalled against a stop (not shown) associated with the waste gate, and no operation of the control system results.

It may therefore be seen that as long as the intake manifold pressure remains at the value which the system has been set to maintain, the waste gate and throttle remain at the positions indicated by the positions of their respective follow up potentiometers in the drawing.

Now let it be assumed that the pressure in the intake manifold steadily decreases, such as might occur if the aircraft climbs steadily to gain altitude. The decrease in pressure in the intake manifold causes the bellows 153 to contract, thereby moving the slider 133 to the left across resistance 132. The potential of output terminal 112 then becomes more positive than the potential of output terminal 114. Therefore, during the time when the amplifier 53 is in control of the throttle motor, a potential is impressed on the input terminals 73 and 74 of a polarity such that terminal 74 is positive with respect to terminal 73. When a potential of this polarity is applied to the amplifier input terminals, the amplifier responds to energize relay winding 66 of relay 64. Energization of relay 64 causes the completion of an energizing circuit for field winding 43 and armature 41 of throttle motor 34. The motor then operates in a direction to open the throttle and to move the slider 38 to the left along resistance 40. As a result of this opening movement of the throttle, the intake manifold pressure is increased to restore it toward its original condition, and at the same time the throttle follow-up potentiometer 37 is operated to reduce the unbalance potential of the bridge circuit.

If the pressure in the intake manifold 21 continues to decrease after the throttle is fully open, the field winding 43 of throttle motor 34 continues to be energized each time that the throttle motor is placed under control of amplifier 53. Since the throttle has reached its fully open position, the motor 34 stalls against a stop, not shown in the drawing, associated with the throttle mechanism. However, when the throttle is fully open and the pressure in the intake manifold continues to decrease, then, during each time that the amplifier 53 controls the waste gate motor 44, a signal is applied to the input terminals of amplifier 53 of a polarity such as to cause energization of relay 64. This causes energization of winding 52 and armature 50 of waste gate motor 44, running the motor in a direction to close the waste gate and to move the slider 47 to the left along resistance 48 so as to rebalance the bridge circuit. It may therefore be seen that, for a given setting of the control point adjuster 167, the positions of the throttle and waste gate bear a definite predetermined relation to the pressure in the intake manifold, and that for each change in the intake manifold pressure a proportionate change takes place in either the throttle or waste gate positions. In other words, the throttle and waste gate are controlled in a modulating manner.

Closure of the waste gate 31 increases the pressure differential across the turbine 13, and thereby causes the turbine to rotate, driving the compressor to increase the pressure of the air supplied to the intake manifold. If the pressure in the intake manifold continues to decrease due to increasing altitude of the aircraft, the waste gate is closed more and more, thereby increasing the pressure differential across the turbine, increasing the turbine and compressor speed, and hence the compression ratio of the compressor so as to restore the pressure in the intake manifold to its desired value.

Conversely, it should be apparent from the foregoing that upon a continued increase in intake manifold pressure, the system first moves the waste gate to fully open position, thereby stopping the compressor, and then starts closing the throttle.

The compensating controller 130 acts to introduce resistance into the upper left arm of the bridge circuit whenever the pressure in the exhaust manifold rises above a predetermined value. The purpose of this controller is to prevent the exhaust manifold pressure from rising to a value where it might seriously interfere with the efficient operation of the engine. It is possible that the control system, in attempting to maintain the intake manifold pressure at a predetermined value, might close the waste gate so far that the exhaust pressure would increase to a point where it interfered with efficient engine operation. The compensating controller 160 prevents such a condition from occurring. When the controller 160 acts, upon an increase in exhaust pressure, to introduce resistance into the upper left arm of the bridge, the bridge is thereby unbalanced in the same sense as if an increase in the intake manifold pressure had occurred. The system responds to such an unbalance by opening the waste gate sufficiently to relieve the pressure in the exhaust manifold.

It is desirable to provide means for preventing over-speeding of the turbine. Such a means is provided in the compensating controller 165, which is operated by a governor device 166 to increase the resistance in the upper left arm of the bridge circuit when the speed of the turbine 13 exceeds a predetermined value. As previously described, upon such an unbalance of the bridge circuit, the system responds to open the waste gate and lower the manifold pressure the correct amount as dictated by the top safe speed of the turbine.

The position of slider 133 of control potentiometer 152 should accurately reflect the pressure in the intake manifold as that pressure varies over a wide range. It has been found in practice that a range of from 17 to 46 inches of mercury includes most pressure conditions encountered. The control potentiometer 152 should therefore be constructed so that a variation in pressure of 29 inches of mercury causes movement of the slider 133 from the right extremity of the resistance 132 to the left extremity. It is generally desirable to maintain the intake manifold pressure in a range, hereinafter termed the "throttling" range, which lies within one inch of mercury more or less of any selected pressure within the wide range. The throttle and waste gate should therefore be sequentially moved throughout their full range as the intake manifold pressure varies through an operating range of two inches of mercury. In order to secure such operation, total effective resistance of the slidewires 40 and 48 and their respective parallel resistances 151 and 150 should be 2/29 of the resistance of element 132. The throttling range, or the range within which the system will maintain the manifold pressure, may be adjusted by varying the resistances 150 and 151, so as to vary the total effective resistance between the opposite terminals of the two follow-up potentiometers in proportion to the resistance of element 132. Furthermore, by relatively varying the two resistances 150 and 151, the proportion of the total throttling range during which the throttle is moved may be varied with respect to the portion of the total throttling range during which the waste gate is controlled. For example, under certain conditions, it may be desired to move the throttle from full closed to full open position as the intake manifold pressure varies over a range of one inch of mercury, and after the throttle is fully opened to move the waste gate from full open to full closed position as the pressure is varied further over another inch of mercury. On the other hand, it may be desirable to move the throttle from full closed to full open position as the intake manifold pressure varies over only ½ inch of mercury, and thereafter to move the waste gate from fully open to fully closed position as the manifold pressure varies further over a range of 1½ inches of mercury. A change from one of these modes of operation to the other may be accomplished by varying the resistances 150 and 151 from a first setting in which the total resistance of the two elements 150 and 48 equals that of the two elements 151 and 40 to a second setting in which the total resistance of the elements 150 and 48 is three times that of the two elements 151 and 40.

In order that the pilot may move the throttling range of two inches to any part of the wide range of 29 inches of mercury over which the system can operate, the resistance of element 122 should be chosen so that its effect on the bridge circuit is comparable to that of control resistance 132. The compensating controller 160 should have its resistance 130 so proportioned that it will introduce resistance into the bridge circuit at a rate which will effect the desired control of exhaust back pressure.

The resistance 125 in the compensating controller 165 should be relatively high, so that it will be effective to absolutely prevent increases in speed of the turbine 13 above a predetermined limiting value.

The most efficient method of operation of the throttle and waste gate is to first open the throttle wide and then to gradually close the waste gate in order to increase the intake manifold pressure. This mode of operation may be termed sequential control of the throttle and waste gate. It may sometimes be desirable, however, to control the throttle and waste gate overlappingly rather than sequentially. More specifically, it may be desired to partially close the throttle and at the same time close the waste gate partially so as to increase the compression ratio of the compressor, thereby increasing the temperature of the air supplied to the carburetor due to the heat of compression. The latter mode of operation is especially desirable when the temperature conditions are such that there is a possibility of the formation of ice in the carburetor. I have therefore provided in the system of Figure 1, means whereby this latter mode of operation may be accomplished. The switch 168 is normally closed, and when so closed, the throttle and waste gate are operated sequentially toward their pressure increasing position, as described above. When the switch 168 is opened, which may either be done manually, or at the command of some device responsive to the presence of icing conditions, the resistance 171 is inserted in the upper left arm of the bridge circuit each time that the amplifier 53 is controlling the throttle motor 34. This increased resistance in the upper left arm of the bridge circuit causes a change in its output potential of the same nature as that which would occur upon an increase in pressure in the intake manifold. Therefore the amplifier 53 responds to this potential by energizing field winding 42 and armature 41 of the throttle motor, so as to run the throttle toward closed position. This movement of the throttle causes a decrease in the pressure in the intake manifold, so that when the system is next put in control of the waste gate motor, the bridge circuit is unbalanced in a direction which causes the waste gate to close by an additional amount, thereby increasing the speed of the turbine and hence the compression ratio of the compressor. When the compression ratio is increased the temperature of the air supplied to the carburetor is increased, so as to melt any ice which may have formed there and to prevent the formation of further ice. Also, the resulting increase in pressure restores the intake manifold pressure to its desired value. Therefore, the system accomplishes a pressure decreasing movement of the throttle and a compensating pressure increasing movement of the waste gate, so that the pressure in the intake manifold is maintained substantially constant, but the temperature of the air supplied to the carburetor is materialy increased. By adjusting the resistance 171, the amount of the pressure decreasing movement of the throttle, and hence the corresponding pressure increasing movement of the waste gate may be controlled within the limits of allowable exhaust back pressure as controlled by compensator 160. In this manner, the amount of heat supplied to the carburetor for de-icing purposes may be varied in accordance with the severity of the icing conditions encountered. It is in connection with this de-icing operation that the compensator 160 is particularly valuable, since the exhaust pressure is at such times more apt to rise to undesired values.

Summarizing the operation of the system of Figure 1, the throttle motor and the waste gate motor are sequentially controlled in response to the pressure in the intake manifold, in such a manner as to maintain the intake manifold pressure within a predetermined range of values. Means are provided, which respond to the exhaust back pressure to prevent that exhaust back pressure from increasing sufficiently to cause damage to the engine, even though a reduction in the intake manifold pressure may be required to produce this result. Further means are provided, which respond directly to the speed of the turbine to modify the control of the waste gate so as to prevent it from reaching an unsafe speed. Means are also provided to control the throttle and waste gate motors overlappingly instead of sequentially, so as to take advantage of the heat of compression of the air passing through the compressor to prevent the formation of ice in the carburetor. This last means may be operated either manually by the pilot or automatically at the command of a device responsive to the presence of icing conditions in the atmosphere or in the carburetor itself.

FIGURE 2

In Figure 2, I have shown an apparatus for controlling the engine speed by means of varying the pitch of a variable pitch propeller 250 operated by the engine 10. This apparatus operates in conjunction and cooperation with the apparatus of Figure 1 as will presently appear.

This apparatus, like that of Figure 1, also includes a Wheatstone bridge circuit, designated generally at 175, which controls an amplifier 176 of the same type as amplifier 53 and which may also be of the type described in the Albert P. Upton application, Serial No. 437,561, filed April 3, 1942, hereinbefore referred to. This amplifier in turn controls a motor 177 which may position a propeller pitch control 178. Such a propeller pitch control may be of the type disclosed in the Martin patent, 2,135,190, issued on November 1, 1938.

The bridge 175 includes a potentiometer type resistance 179 and another similar potentiometer type resistance 180, shunted by a rheostat type resistance 181. The input terminals 182 and 183 are here shown as connected by conductors 184 and 185, respectively, to the secondary winding 186 of a transformer 187 for supplying an alternating current potential to the bridge. The upper right branch of the bridge then includes a fixed resistance 188 connected between the point 182 and the right end of resistance 179, and the lower right branch has another fixed resistance 189 connected between the point 182 and the right end of the resistance 180. The upper left branch of the bridge includes a first resistance 190 and a second resistance 191, variable portions of which are series connected between the point 183 and the left end of resistance 179 by means to be described later. The lower left branch is completed by a fixed resistance 192 connected between the point 183 and the left end of resistance 180.

A slider or slider arm 193 is arranged in connection with the resistance 179 and is here shown as driven by the shaft 194 of a tachometer 195 which registers the engine speed. The resistance 180 has a slider or slider arm 196 fixed to a shaft 197 which is driven by the motor 177 through a gear box 198, this slider arm 196 also having an extension 199 to which is connected one end of a link 200. The other end of this link is connected to a control arm 201 which may be a part of the propeller control 178 for adjusting the pitch of the variable pitch propeller 250.

The sliders 193 and 196, as will be evident, serve as points for detecting an unbalance in the bridge 175, and they are accordingly connected to the input of the amplifier 176. A conductor 202 leads from the slider 193 to one input terminal 203 of the amplifier and to this terminal is also connected one end of a potentiometer type input regulating resistance 204. The other end of this resistance 204 is connected to the other slider 196 by a conductor 205 and the variable contact 206 of the resistance is connected to the other input terminal 207 of the amplifier.

The amplifier may be supplied with the necessary operating potential by a transformer 208 connected to the same source of power as transformer 187. Included in the amplifier are two relays 209 and 210. The relay 209 comprises a winding 211 which controls the movement of a switch arm 212 cooperating with a stationary contact 213 with which it is engaged when the winding is sufficiently energized. In similar manner, the relay 210 comprises a winding 214 which pulls a switch arm 215 into contact with stationary contact 216. Both contact arms are biased to normally open the circuits. Both switch arms 212 and 215 are connected by conductors 219 to one side of a battery 220, the other terminal of which is grounded as represented at 221.

As has been explained hereinbefore, the relay windings 211 and 214 are selectively energized by the amplifier 176 in accordance with the phase of an alternating signal potential applied to the input terminals 203 and 207 of the amplifier. That is, when the signal applied to these terminals is of a certain phase with respect to the power supplied by transformer 209, the winding 211 may be energized, while a change in phase of the signal through one hundred and eighty electrical degrees will cause energization of the other winding 214.

The motor 177 is shown for example as being of a direct current series wound type having an armature 222 and a pair of field windings 223 and 224. One field winding 223 is connected by a conductor 225 to the relay contact 213 while the other winding 224 is connected by conductor 226 to the other relay contact 216. With the relay 209 energized, a circuit may be traced from the battery 220 through the conductor 219, switch arm 212, contact 213, conductor 225, and field winding 223 through the armature 222 of the motor and to ground at 227 and 221, the circuit when thus completed causing the energization of field winding 223 from the battery and causing the motor 177 to run in one direction. When the relay 210 is energized, the circuit from the battery 220 is completed through the conductor 219, switch arm 215, contact 216, conductor 226, field winding 224 and armature 222 to the grounds 227 and 221, which causes energization of the field winding 224 to rotate the motor in the opposite direction. It is evident therefore that the direction of motor rotation will vary in accordance with the phase of the input signal of the amplifier.

Obviously I may, if preferred, employ a split phase alternating current motor in lieu of the direct current motor here shown, operating the same either under control of the amplifier relays, or by means of a discriminator amplifier (not shown) forming a part of the amplifier 176.

Contact to the resistance 190 of the bridge 175 is made through a contact arm 228 mounted on a shaft 229 by which it may be manually adjusted along the resistor in a manner to be pointed out in detail hereinafter. Contact to resistance 191 is made by a slider or contact arm 230 which may be pivoted at 231. Movement of this slider 230 is controlled in accordance with changes in atmospheric pressure and, as an example of a suitable apparatus for this purpose, I have shown an evacuated bellows 232 having two thin corrugated sides and an internal spring to expand the same against the effect of atmospheric pressure. One side of the bellows is secured to a rigid support 233 and the other is connected as at 234 to slider 230. The arrangement is such that a decrease in the atmospheric pressure surrounding the bellows 232, which may be due to an increase in the altitude at which the aircraft flies, will cause the bellows to expand moving the slider 230 along the resistance 191 and increasing the amount of such resistance inserted in the upper left branch of the bridge. An increase in atmospheric pressure will cause this operation to be reversed. A conductor 235 connects the resistor 191 to the slider 228.

Operation of Figure 2

The conductors 202 and 205 represent the leads from the bridge 175 across which unbalance voltages will occur when the bridge is unbalanced. That is, when the sliders 193 and 196 are properly positioned these points will be at balance and there will be no voltage across the conductors 202 and 205, but when either slider is moved toward either side, the bridge will be unbalanced and a voltage will appear on the conductors. This voltage may be either positive or negative at any precise instant, depending upon the direction of such unbalance. Since the bridge is supplied with an alternating potential through transformer 187, the unbalance voltage will appear at the input of the amplifier as an alternating signal potential but the phase angle will be reversed as the bridge is unbalanced in one direction or the other. The resistance 204 acts conventionally as a gain or input relating control, permitting the amplitude of the input signal actually applied to the amplifier to be manually selected.

Considering now the operation in detail, the pitch control 178 is assumed to be of the type commonly used to adjust the propeller pitch. In the following operation, it is assumed that this control merely changes the pitch of the propeller blades. If desired, however, the control may take the form of the conventional propeller governor in which an internal speed responsive device adjusts the pitch to maintain a selected speed. My invention, as it is herein shown, provides means for electrically, or electronically, adjusting either type of such a control to maintain different engine speeds.

For convenience in this description it will be assumed that a movement of the link 200 toward the left, as indicated by the arrow in Figure 2, will adjust the pitch control 178 to increase the pitch of the propeller associated therewith and hence to decrease engine speed by increasing the effective load on the engine. Such movement of the link 200, by the motor 177, will be accompanied by a swinging movement of the slider 196 toward the right along resistance 180.

It will likewise be assumed that an increase in engine speed will be reflected, through operation of the tachometer 195, in a movement of the slider 193 toward the right along the resistance 179.

Assuming the propeller pitch control 178 to be of the type which merely adjusts the pitch upon actuation thereof and does not control the speed itself, the tachometer 195 is normally effective to so position slider 193 to maintain the propeller speed at any desired value. For example, if the propeller speed starts to rise, this will cause slider 193 to be moved to the right with respect to resistor 179. The relative amount of resistance in the upper left-hand branch of the bridge will now be greater than that in the upper right-hand branch so that the bridge will be unbalanced in a predetermined direction. This will cause a signal of a predetermined phase relationship with respect to the terminal voltage of secondary 186 of transformer 187 to be supplied to the input terminals 203 and 207 of the amplifier 176. As a result, one or the other of the two relays 209 and 210 will be energized to cause a circuit to be established to one of the field windings of the motor and to its armature. This will cause rotation of motor 177 in a predetermined direction. The motor is so connected to the amplifier that under these conditions, the motor will be rotated in a direction to move link 200 to the left to increase the pitch of the propeller. This will cause a decrease in the engine speed. At the same time, the slider 196 is moved to the right so as to increase the resistance in the lower left-hand branch of the bridge relative to that in the lower right-hand branch of the bridge, thus tending to rebalance the bridge. The change in pitch will also result in a decrease in the speed of the engine which will in turn cause slider 193 to be moved to the left. The bridge will eventually be rebalanced with the speed restored to approximately the desired value and with the propeller pitch control 178 in a slightly different position in which the pitch is greater so as to maintain the desired speed.

It will be apparent that if the speed decreases at any time, the slider 193 moves in an opposite direction. Under these conditions, the unbalance of the bridge is opposite to that previously considered and the output voltage of the bridge is reversed 180 degrees with respect to that existing in the operation just described. As a result, the other of the two relays 209 and 210 will be energized to cause an opposite rotation of motor 177. This will cause the propeller pitch control to be moved in a direction to decrease the pitch to cause the slider 196 to be moved to the left. In other words, the effect under these conditions is exactly opposite to that previously considered.

If the slider 228 is adjusted with respect to resistor 190, the speed maintained by the bridge is altered. For example, if slider 228 is moved to the right so as to decrease the portion of resistor 190 connected into the bridge network, the effect is to decrease the resistance in the upper left-hand portion of the bridge relative to that in the upper right-hand portion. As a result, the bridge is unbalanced in the same direction as though there were a decrease in the speed of the propeller. As explained above, this has the effect of decreasing the propeller pitch so as to increase the speed. While the propeller tachometer 195 tends to overcome this change in speed, it cannot do so because the only way in which the tachometer can increase the pitch to decrease the speed is for the speed to rise. In other words, the control point of the tachometer is actually raised. Thus, when the slider 228 is moved to the right with respect to slider 190, the speed maintained by tachometer 195 is increased. When the slider 228 is moved to the left so as to increase the resistance in the upper left-hand portion of the bridge, the unbalance of the bridge is in the opposite direction so that the speed tends to decrease. In this case, the control point of the tachometer is decreased.

It is evident therefore that the slider 228 and resistor 190 are effective to adjust the bridge controlling the pitch control 178 so that any desired propeller speed is maintained.

The atmospheric pressure responsive controller associated with resistor 191 is effective to change the propeller speed as the altitude of the aircraft increases or decreases. As the airplane ascends to higher altitudes, it is desirable to increase the propeller speed. As the airplane ascends, for example, the density of the air becomes increasingly less. The propeller tends to rotate at an increasing speed, but this tendency is counteracted by the tachometer 195 which is effective to continually increase the pitch of the propeller blades so as to increase their "bite" and hence prevent the speed from becoming excessive. The propeller is, however, acting on rare air and consequently does not have as much effect when revolving at the same speed as it does at lower altitudes. Consequently, it is desirable in order to obtain higher propeller efficiency to compensate the action of the controls to permit an increase of speed with an increase in altitude.

As the altitude increases, the bellows 232 expands to an increasing extent to cause the movement of slider 230 to the right, as indicated by the legend. This causes a decrease in the resistance in the upper left-hand branch of the bridge to cause the bridge to be unbalanced in exactly the same manner as when there has been a decrease in the speed. The effect of this, it will be recalled, is to cause an adjustment of the pitch control 178 in such a manner as to increase the speed. Thus, the effect of the change in altitude is to increase the setting of the bridge. It will be obvious that upon a decrease in altitude, the slider 230 is moved to the left to have an opposite effect upon the speed maintained by the bridge.

In the above operation, it has been assumed that the pitch control 178 has no controlling action of its own. Where this control takes the form of a conventional propeller governor, such as the type shown in the above mentioned Martin patent which contains its own independent speed responsive device, it tends by itself to maintain the propeller speed for which it is set. In such a case, the tachometer functions to compensate the control apparatus for minor variations in engine speed due to possible inaccuracies in the operation of the governor. This is particularly true in the case of multi-engined aircraft wherein the controls 179 and 193 for each engine would synchronize the propeller speeds regardless of minor inequalities in the control by the separate governors.

*Cooperation of Figures 1 and 2*

In accordance with my present invention I place the apparatus of Figure 1 and that of Figure 2 under one manual control thus permitting the pilot of the aircraft to conveniently adjust his engine power and speed. For this purpose the shaft 229 operating the selector slider 228 of Figure 2 is connected to the knob 169 of the selector 167 of Figure 1 as clearly shown in both views. The movement of knob 169 will then adjust both the sliders 121 and 228 along their respective resistances 122 and 190 placing both the throttle 20 and waste gate 31 and the propeller pitch control 178 under single control.

In the operation of an aircraft engine it is desirable, in order to increase power, to first build up the manifold pressure and engine speed to certain relatively low values and then for higher power to build up engine speed before increased manifold pressures are provided. This is so that the propeller speed will be of a value permitting the propeller to utilize the increased power resulting from high manifold pressures and because the engine would likely be injured by operation at low speeds and high manifold pressures since the pistons would not be moving fast enough to absorb the energy from the expanding gases in the cylinders. The upper limits of power are then secured by increasing the manifold pressures while further increasing engine speed along proportional lines dictated by the efficiency curve of the propeller employed.

The proper adjustments are thus seen to be divided into three ranges, the first in which manifold pressure and engine speed are both increased and to a relatively low value, a middle range in which engine speed alone is increased, and a third range in which manifold pressure and engine speed are further increased in a certain proportion and to the maximum permissible values.

To accomplish these operations in proper sequence and proportions, the values of resistances 122 and 190 are selected in accordance with the movements of the respective sliders 121 and 228 by the control knob 169 and the resistance 122 is provided at its midpoint with a slidewire portion 236 during the travel over which the slider 121 will not vary the effective resistance in the bridge circuit of the apparatus of Figure 1. Now starting from an initial or "off" position of the sliders, at left-hand ends of the resistors 122 and 190, the first increment of movement of the slider 121 will cause the throttle 20 to open and the wastegate 31 to close, if necessary to build up the selected manifold pressure, while the same movement of slider 228 will adjust the propeller pitch control 178 to increase engine speed. As the slider 121 reaches the slidewire portion 236 of resistance 122 the manifold pressure and engine speeds will have reached the desired relatively low values. Further movement of the control knob 169 through its mid-range will then decrease the value of the resistance 190, only, resulting in a further increase in engine speed without direct effect on throttle and manifold pressure settings, since the resistance 122 does not vary at this time. Continued movement of the control knob 169 through the balance of its range will then decrease the value of both resistances 122 and 190, progressively closing the waste gate 31 and adjusting the propeller pitch control 178 to increase engine speed, so that the propeller may properly utilize the maximum power.

FIGURE 3

In Figure 3 I have shown diagrammatically the application of the unitary manifold pressure and engine speed control to multi-engined installations. Control mechanism for four engines is shown and for each engine this mechanism including a throttle and manifold pressure control 237, like that of Figure 1, and a propeller pitch or engine speed control 238, like that of Figure 2. These controls are shown merely by diagram blocks, since they are duplicates of the apparatus previously described herein.

Each control apparatus 237 includes a resistance 239, and a slider 240 therefor, which correspond in function to the resistance 122 and slider 121 of Figure 1 and which resistance has an intermediate slidewire portion 241 similar to that previously numbered 236. Each control apparatus 238 likewise has a resistance 242, and slider 243, corresponding to the parts 190 and 228 of Figure 2. The eight sliders 240 to 243 are mounted in tandem, or ganged, upon a common actuating shaft 244 which may be rotated by gears 245—246 from a manually controlled selector handle or crank 247.

In operation it will be obvious that the pilot, by properly adjusting the one handle 247, may actuate all of the sliders 240 to 243 causing them to traverse their associated resistances 239 to 242 in unison and in such manner as to first increase engine manifold pressure and speed, to a certain value, then increase engine speed only, and finally again increase engine manifold pressure and speed to the highest permissible values. This operation will be reversed by opposite movements of handle 247, and in all cases the several engines and propellers will be identically controlled.

The tachometer driven slider 193 forming a part of each control unit 238 will, as has been previously described, accurately synchronize the engine speeds of all engines, while the altitude compensating resistances 191 of each unit 238, will adjust the pitch of the several propellers as required for best results at varying altitudes.

While I have herein shown and described certain embodiments of my invention, others will occur to those skilled in the art, and I therefore limit my invention only by the appended claims.

I claim as my invention:

1. In combination with an aircraft engine having a combustion chamber and a variable pitch propeller driven by said engine, means for supplying air to the combustion chamber of said engine, a device for varying the pressure of said air, means including a normally balanced electrical impedance network responsive to the pressure condition of said air operatively connected to said device for controlling said device to maintain said pressure condition at a predetermined value, movable means connected to said network for adjusting the electrical balance point of said network to vary said predetermined value and effective upon continual movement thereof to increase the value at which said pressure condition is maintained during an initial range of movement of said movable means, to maintain it constant during an intermediate range of movement of said movable means, and to again increase said value during a final range of movement, means for automatically controlling the propeller pitch to maintain the engine speed at a predetermined value, movable means for adjusting said last named means, and a single manual control connected to both of said movable adjusting means to position them simultaneously.

2. Electrical apparatus for controlling the pressure of the air supplied to the intake manifold of a power plant having a compressor for supplying air to the manifold, and for controlling the speed of the power plant through a speed regulator which varies the loading of the power plant, comprising in combination, means for controlling the compressing effect of the compressor, electrical means for adjusting said compressing effect controlling means, means including a balanceable electrical impedance network for controlling said electrical adjusting means and connected thereto by electrical leads, a variable impedance device connected in said network, a manual control means for operating said impedance device to vary the compressing effect of said compressor, control means including a device responsive to power plant speed for adjusting said speed regulator and the loading of the power plant to maintain a selected speed, and means positioned by said manual control means for adjusting said last named control means to vary simultaneously the power plant speed as the compressing effect of said compressor is varied.

3. Apparatus for controlling a power plant, comprising in combination, means for controlling the pressure of air supplied to the intake manifold of the power plant by a compressor arranged in connection with the power plant, said means including means for controlling the compressing effect of the compressor, electrical motor means for operating said compressing effect controlling means, electrical means including a normally balanced electrical impedance network having a manually adjustable variable impedance device for varying the balance of said network to control the motor means, means for controlling the power plant speed by varying the loading of the power plant, and a single manually operable means for varying said manually adjustable impedance device and simultaneously adjusting said power plant speed control.

4. Apparatus for controlling a power plant having a compressor, an intake manifold, and a device for varying the loading of the power plant, comprising in combination, means for controlling the pressure of air supplied to the intake manifold by a compressor arranged in connection with the power plant, said means including means for controlling the compressing effect of the compressor, electrical motor means for operating said compressing effect controlling means, electrical means including an electrical impedance network having a manually adjustable variable impedance device for controlling the motor means, and means for controlling the power plant speed by varying the loading of the power plant, comprising motor means for adjusting said device, electrical means including a balanceable electrical network having a manually adjustable variable impedance device for controlling this motor means, and the said manually adjustable variable impedance devices of the respective networks being mechanically connected for simultaneous manual operation.

5. Apparatus for controlling an aircraft engine having an intake manifold, a compressor and a variable pitch propeller, comprising in combination, means for controlling the pressure of air supplied to the intake manifold of the engine by the compressor arranged in connection therewith, said means including means for controlling the compressing effect of the compressor, motor means for operating said compressing effect controlling means, means including an electrical impedance network having a manually adjustable variable impedance device operative for controlling the motor means, and means for controlling the engine speed by varying the pitch of the variable pitch propeller connected thereto comprising motor means for adjusting the pitch of the propeller, means including an impedance network having a manually adjustable variable impedance device operative for controlling this motor means, and the said manually adjustable variable impedance devices of the respective networks being operatively connected for adjustment simultaneously to increase or decrease the manifold pressure of the engine while correspondingly varying the engine speed, and the said variable impedance device in the compressing effect controlling network being arranged to maintain the manifold pressure substantially constant at a selected value while the engine speed is increased by the second variable impedance device.

6. Control apparatus for adjusting the propeller pitch of a plurality of aircraft engines to thereby vary the engine speeds, comprising in combination, means for varying the pitch of each propeller, each pitch varying means including an electrical impedance network and a motor means controlled thereby, each impedance network including a manually controlled impedance for varying the propeller pitch, each impedance network also including another variable impedance responsive to engine speed and adapted to control the motor means to hold such speed to manually selected values, rebalancing impedance in each impedance network variably adjusted by said motor means, and manual means connected to all of said manually controlled impedances for simultaneously varying the same.

7. Means for altering the pitch of a controllable pitch aircraft propeller comprising, in combination, pitch-changing mechanism for the propeller, a normally balanced electrical impedance network adapted to produce an alternating potential variable in phase in accordance with the direction of unbalance of said network, means arranged to vary an element of said network to select a pitch setting of the propeller, means for rebalancing said network, adjustable means positioned independently of said rebalancing means for varying the rebalancing effect of said rebalancing means, reversible actuating means driving said rebalancing means, means controlling the direction of operation of said actuating means in accordance with the phase of said potential, and an operative connection between said actuating means and the pitch-changing mechanism of the propeller.

8. Means for varying the pitch of a controllable pitch aircraft propeller in such a way as to maintain a substantially constant propeller speed, comprising in combination a speed responsive device, a normally balanced electrical impedance network, a tap having a variable connection to an impedance of said network, said connection being varied by said speed responsive device, a second tap, having a variable connection to an impedance of said network, and capable of adjustment to a point on said impedance such that said network is balanced, and means connected to cause movement of said second tap to a point at which said network is balanced and to effect simultaneous adjustment of the pitch of the propeller.

9. Means for automatically varying the pitch of a controllable pitch aircraft propeller driven by an aircraft engine comprising, in combination, a speed responsive device, a normally balanced electrical network of two parallel branches, means varying an impedance in one of said branches of said network in response to variations in altitude of the aircraft, a tap having a variable connection to said one branch of said network and controlled by said speed responsive device, a second tap having a variable connection to the other branch of said network and capable of adjustment to a point on said network of equal potential with said first tap, and means responsive to an unbalance of said network connected thereto to move said second tap automatically to said equal potential point and to effect simultaneous adjustment of the pitch of the propeller.

10. In a control for altering the pitch of a controllable pitch aircraft propeller, driven by an engine carried by an aircraft, a combination including a balanceable electrical network adapted to produce an alternating output potential variable in phase in accordance with the direction of unbalance of said network, means responsive to the speed of the propeller and arranged to vary an impedance in said network in accordance with the speed, means responsive to the altitude of the aircraft and arranged to vary an impedance in said network in accordance with altitude variations, means for rebalancing said network, reversible actuating means driving said rebalancing means, means controlling the direction of operation of said actuating means in accordance with the phase of said output potential, and an operative connection between said actuating means and the pitch-changing mechanism of the propeller.

11. Control means for a controllable pitch aircraft propeller which is driven by an engine carried by an aircraft including a bridge circuit having a pair of input terminals, a source of potential therefor, parallel branches of series impedances between said input terminals, an output terminal at an intermediate point on each of said branches, means varying an impedance in one of said branches in accordance with the speed of the propeller, means varying another impedance in one of said branches in accordance with the altitude of the aircraft, and means varying the pitch of the propeller in accordance with the polarity and magnitude of the potential difference between said output terminals.

12. In combination with a variable pitch propeller, a governor including a speed responsive device for controlling the pitch of said propeller to maintain the propeller speed at a selected value, means for adjusting said governor to change the value of propeller speed maintained by said governor, a motor for positioning said adjusting means, a follow-up impedance network controlling the operation of said motor, a manually adjustable impedance for varying an impedance in said network to vary the position of said motor and hence of said adjusting means, and a further impedance in said network adjusted by an additional speed responsive device independent of said governor speed responsive device variable in accordance with the speed of said propeller and effective to correct minor inequalities in speed occurring despite said governor.

13. In combination with an aircraft having a plurality of variable pitch propellers, a governor including a speed responsive device associated with each propeller for controlling the pitch of said propeller to maintain the propeller speed at a selected value, means for adjusting each governor to change the value of propeller speed maintained by said governor, a motor associated with each adjusting means for positioning the same, a separate follow-up impedance network for each of said motors, a variable impedance in each network adjusted by an additional speed responsive device independent of said governor speed responsive device variable in accordance with the speed of the propeller and effective to cause operation of the associated motor to correct minor inequalities in speed to maintain synchronism of said propellers, a further variable impedance in each network for varying the speed maintained by said governor, and a single manually operable device for simultaneously adjusting all of said further variable impedances.

14. Control apparatus for use with a power plant having a combustion chamber and a variable loading device driven by the power plant, comprising in combination, electrical motor means for affecting the flow of air to the power plant, means including a normally balanced electrical impedance network responsive to the pressure condition of said air connected to said motor means by electrical leads and controlling said motor means to maintain said pressure condition at a predetermined value, a movable selector for adjusting the balance of said network to vary said predetermined value, control means for automatically controlling the loading device to maintain the power plant speed at a predetermined value, and a single manual control connected to said movable selector and said control means for simultaneously positioning said selector and said control means.

15. Control apparatus for use with a power plant having a combustion chamber, a compressor supplying air to the combustion chamber having a control device for regulating the compressing effect, a throttle for controlling the flow of air to the chamber and a variable loading device driven by the power plant, comprising in combination, a first electric motor for positioning the throttle, a second electric motor for positioning the control device, current controlling means including a normally balanced electrical impedance network having means responsive to a pressure condition of the air connected by electrical leads to said motors and automatically controlling both of said electric motors to maintain the pressure condition at a predetermined value, movable means for adjusting said impedance network to vary said predetermined value, means for automatically controlling the effect of the loading device to maintain the engine speed at a predetermined value, and a single manually operated control connected to both said last named means and said movable means to position them simultaneously.

16. Control apparatus for use with a power plant having a combustion chamber, a compressor supplying air to the combustion chamber having a control device for regulating the compressing affect, a throttle for controlling the flow of air to the chamber and a variable loading device driven by the engine, comprising in combination, a first electric motor for positioning the throttle, a second electric motor for positioning the control device, a balanceable electrical impedance network associated with both of said motors for controlling the position thereof including two rebalancing impedances, one positioned by each of said motors, said network means also including an impedance variable in accordance with a pressure condition of the air and being effective to operate said motors in such a manner as to maintain said pressure condition at a predetermined value, movable means for adjusting said network to vary said predetermined value, control means for automatically controlling the variable loading device to maintain the power plant speed at a predetermined value, and a single manually operated control connected to both said last named means and said movable means to position them simultaneously.

17. Control apparatus for controlling the pressure of air supplied the intake manifold of an aircraft engine by a compressor and for controlling the engine speed by varying the pitch of a variable pitch propeller connected thereto, said control apparatus including means for controlling the operation of the compressor and said means including a manually adjustable control device, means for varying the pitch of the propeller and including another manually adjustable control device, said control devices each including a variable resistance having a slider and the respective sliders being operatively connected for adjustment simultaneously, a pair of electrical impedance networks, each of said networks having therein one of said variable resistances, means including said impedance networks and said control devices for varying the operation of the compressor and the pitch of the propeller, respectively, as the effective values of the resistances are varied by movement of said sliders, and the resistance associated with said compressor controller device having a portion of high conductivity over which the movement of the associated slider will provide no variation in the effective value of the resistance, and adjustable impedances in each of said networks for coordinating the relative effects of said control devices.

18. A control apparatus for a plurality of aircraft engines for varying the pressure of air supplied to the intake manifold of each engine by its associated compressor and for varying the speed of each engine by changing the pitch of a variable pitch propeller associated therewith, comprising in combination, separate control means for controlling the compressing effect of each compressor, said control means including a balanceable electrical impedance network and a movable control for variably adjusting the balance of said network and thereby the controlling effect of the associated control means, separate control means for varying the pitch of each propeller, said separate means including a movable selector for selecting different pitch settings and thereby the speed of the associated engine, a manual adjustor, and means connecting said manual adjustor to said movable selectors and controls associated with each of said engines so that said adjustor when adjusted will effect changes in manifold pressures and engine speed simultaneously at predetermined relative rates.

19. A control apparatus for adjusting the intake manifold pressures and operating speeds of a plurality of internal combustion engines, comprising in combination, separate control means for controlling the compressing effect of each engine, said control means including a balanceable electrical impedance network and a movable control for variably adjusting the balance of said network and thereby the controlling affect of the associated control means, said network having the portion thereof associated with said movable control with a highly conductive area in the range of movement of said control so that while moving through said range said control is ineffective to vary the controlling affect of the associated control means, separate control means for varying the pitch of each propeller, said separate means including a movable selector for selecting different pitch settings and thereby the speed of the associated engine, means interconnecting the movable selectors and controls of all of said engines to a single control, and means including said single control for varying said selectors and controls through a first range of values to effect variations in manifold pressure and engine speed, through a second range of values to effect a manifold pressure which is constant and engine speed which is varying and then through a third range to effect variations in both the manifold pressure and engine speed.

HUBERT T. SPARROW.

REFERENCES CITED

The following references are of record in the file of this patent:

UNITED STATES PATENTS

| Number | Name | Date |
|---|---|---|
| 1,374,787 | Walker | Apr. 12, 1921 |
| 1,908,894 | Findley | May 16, 1933 |
| 1,942,587 | Whitman | Jan. 9, 1934 |
| 2,246,686 | Jones | June 24, 1941 |
| 2,293,502 | Hermann | Aug. 18, 1942 |
| 2,314,610 | Day | Mar. 23, 1943 |
| 2,336,844 | Buck | Dec. 14, 1943 |
| 2,366,968 | Kaufman | Jan. 9, 1945 |
| 2,383,719 | Halford et al. | Aug. 28, 1945 |
| 2,387,795 | Isserstedt | Oct. 30, 1945 |
| 2,389,003 | Schorn | Nov. 13, 1945 |
| 2,400,799 | Woods | May 21, 1946 |
| 2,403,243 | Seppeler | July 2, 1946 |
| 2,408,683 | Price | Oct. 1, 1946 |
| 2,427,794 | Lee | Sept. 23, 1947 |
| 2,427,813 | Roby et al. | Sept. 23, 1947 |
| 2,482,559 | Schneider | Sept. 20, 1949 |

FOREIGN PATENTS

| Number | Country | Date |
|---|---|---|
| 797,178 | France | Apr. 22, 1936 |